UNITED STATES PATENT OFFICE.

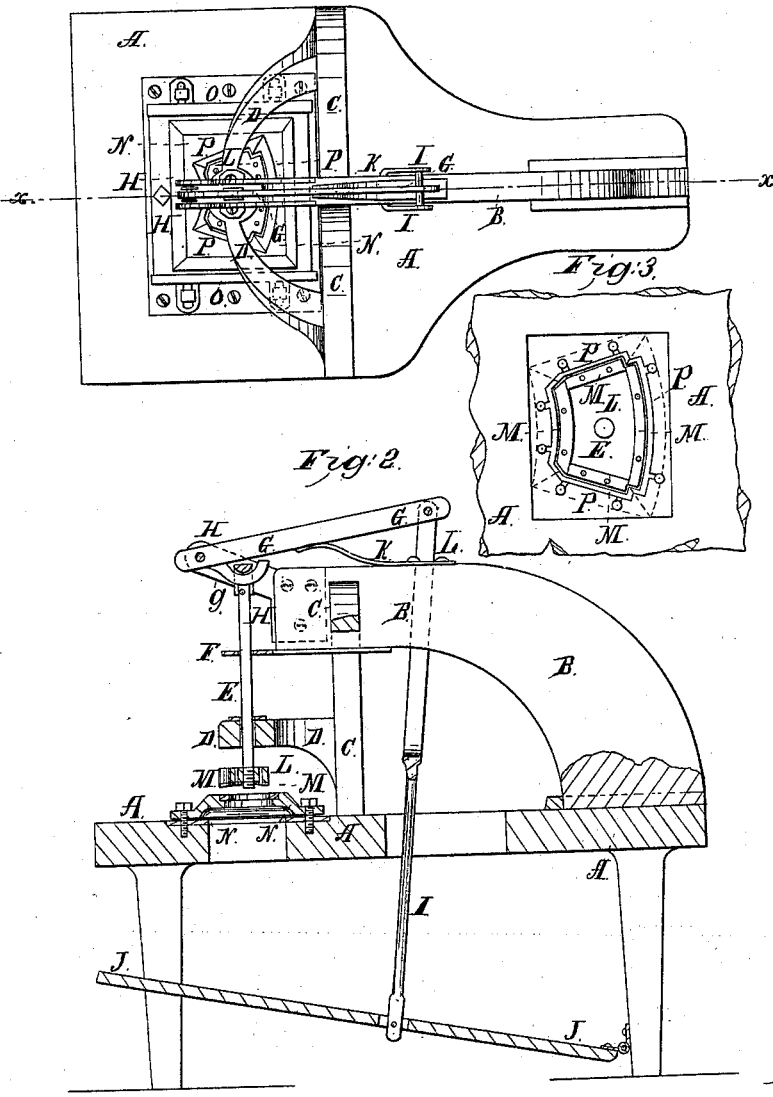

WALTER FORSHEE AND JESSE L. JUDD, OF MARATHON, NEW YORK.

IMPROVEMENT IN MACHINE FOR TINNERS' USE.

Specification forming part of Letters Patent No. 80,937, dated August 11, 1868.

*To all whom it may concern:*

Be it known that we, WALTER FORSHEE and JESSE L. JUDD, of Marathon, in the county of Cortland and State of New York, have invented new and Improved Machine for Tinners' Use; and we do hereby declare that the following is a full, clear, and exact description thereof, which will enable those skilled in the art to make and use the same, reference being had to the accompanying drawings, forming part of this specification, in which—

Figure 1 is a top or plan view of our improved machine. Fig. 2 is a side view of the same, partly in section, through the line $x \, x$, Fig. 1. Fig. 3 is an under-side view of the dies.

Similar letters of reference indicate corresponding parts.

Our invention has for its object to furnish an improved machine for tinners' use, designed especially for cutting out flaring work, such, for instance, as the sides of pans, pails, basins, &c., with dies, which shall be simple in construction, easily operated, effective in operation, and readily adjusted to cut out work of different sizes; and it consists in the construction and combination of the various parts, as hereinafter more fully described.

A is the bed-plate of the machine, which may be secured to the work bench or table, or which may be provided with legs, as shown in Fig. 2. B is the standard, which is made in about the shape shown in Fig. 2, and the rear end or base of which is securely bolted to the rear part of the bed-plate A. The forward end of the standard B is supported and braced upon each side by the braces C, the upper ends of which are securely bolted to the sides of the forward end of the standard B, and the lower ends of which are securely bolted to the bed-plate A.

D is a semicircular or curved horizontal guide-bar, the ends of which are securely bolted to the inclined braces C, and through the middle part of which the square rod E passes. The rod E passes up through the guide F, attached to and projecting in front of the forward end of the standard B.

Upon the upper end of the rod E is formed, or to it is securely attached, an eye, which hooks upon the hook $g'$, formed upon or attached to the under side of the forward part of the lever G, as shown in Fig. 2. The forward end of the lever G is pivoted to and between the forward end of the two arms H, attached to the opposite sides of the forward end of the standard B. The rear part of the lever G extends back along and above the upper edge of the standard B, and to its rear end is pivoted the upper end of the connecting-rod I.

The upper part of the rod I is branched or slotted, as shown in Figs. 1 and 2, so as to pass down upon both sides of the standard B, which thus serves as a guide to prevent the said rod I from getting out of place. The lower end of the connecting-rod I is pivoted to the treadle or foot-lever J, the rear end of which is pivoted or hinged to some suitable support, and the forward end of which extends forward into such a position that it can be conveniently reached and operated by the workman with his foot.

K is a spring attached to the upper edge of the standard B, and which presses against the under side of the lever G with such force as to bring the various operating parts of the machine back into their ordinary position after each cut as soon as the foot-lever has been released from the pressure upon it.

Upon the lower end of the rod E is cut a screw-thread in such a way as to leave a square shoulder at the base of the said screw-thread.

L is the upper die, which screws upon the lower end of the rod E, so as to rest against the square shoulder of said rod. M are the cutters or knives of the upper die, L, which are made in four parts or pieces, and which are placed in grooves formed upon the face or lower side of said die, around its edge, and which are secured in place by screws passing through the body of the said die L and screwing into the said knives M, as shown in Figs. 1, 2, and 3. N is the lower die, the side edges of which enter and slide in grooves in the guides O, which said guides are secured to the bed A by bolts which pass through the said bed and through slots in the guides O, so that the said guides may be adjusted to compensate for any variation in size of the different dies used in the machine. The die N, when adjusted, is secured in place by being bolted to the bed A, as shown in Figs. 1 and 2.

P are the knives or cutters of the lower die, which are made in four parts or pieces, are placed in grooves or recesses in the edge of the face of the lower die, N, and which are adjustably secured in place by screws passing through slots in the die N, and screwing into the said knives or cutters P, as shown in Fig. 3. This construction enables the knives P to be taken out and sharpened, and then adjusted or set up to the cutters or knives M of the die L.

It will be observed the forward part of the machine, at the front and sides of the dies, is unobstructed, so that the material to be cut can be conveniently adjusted in place.

We claim as new and desire to secure by Letters Patent—

1. Forming the knives or cutting parts P of the die N in four or more pieces, separate from and adjustably secured to the body N of the die, substantially as herein shown and described, and for the purpose set forth.

2. Making the grooves O, which receive the dies N, adjustable, substantially as herein shown and described, and for the purpose set forth.

3. The combination and arrangement of the bed-plate A, standard B, braces C, curved horizontal guide D, dies L M and N P, rod E, hooked lever G, spring K, connecting-rod I, and treadle or foot-lever J with each other, substantially as herein shown and described, and for the purpose set forth.

WALTER FORSHEE.
JESSE L. JUDD.

Witnesses:
ALFRED G. SMITH,
LEWIS SWIFT.